United States Patent Office 2,951,052
Patented Aug. 30, 1960

2,951,052

LIGHT STABILIZER MIXTURE

Joseph R. Darby, Webster Groves, Mo., assignor to Monsanto Chemical Company, St. Louis, Mo., a corporation of Delaware No Drawing. Filed Mar. 31, 1958, Ser. No. 724,888

34 Claims. (Cl. 260—23)

This invention relates to a novel light stabilizer mixture for halogen-containing resin compositions and the stabilized compositions obtained thereby.

Halogen-containing resins are notoriously unstable upon exposure to heat and ultraviolet light. This instability is evidenced by the rapid discoloration and serious stiffening apparent after exposure to processing temperatures, and/or to outdoor weathering. Moreover, this instability is sometimes aggrevated by the presence of plasticizers and other additives which are themselves prone to degradation. It is imperative then for the successful use of these halogen-containing resin compositions, that the formulation must contain additives capable of preventing this discoloration and loss of physical properties which occurs during processing and/or exposure to outdoor conditions, particularly ultraviolet light effects.

Accordingly, it is an object of this invention to provide a novel light stabilizer mixture for halogen-containing resins. A further object of this invention is to provide halogen-containing resin compositions which have improved light stability. Other objects will become apparent from the following description of the invention.

In accordance with the invention it has been found that the light stability properties of halogen-containing resins are substantially improved by incorporating therein a mixture of a phosphite ester and a 2-hydroxybenzophenone which has an ultraviolet light cutoff of 85% in the region of from about 340 to about 400 millimicrons.

The phosphite esters which are useful in the mixtures and compositions of this invention are of the structure:

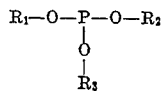

wherein $R_1$ and $R_2$ are selected from the group consisting of hydrogen and like or unlike organic radicals containing from 4 to 18 carbon atoms and $R_3$ is an organic radical containing from 4 to 18 carbon atoms. For example, they may be aryl radicals such as phenyl, tolyl, ethylphenyl, xylyl, cumyl, cymyl, xenyl, naphthyl, biphenyl, or substituted aryl radicals such as alkoxy substituted aryl radicals, e.g. 4-methoxyphenyl, 2,4-dimethoxyphenyl, ethoxyphenyl, butoxyphenyl, etc., or halo-substituted aryl radicals, e.g. 4-chlorophenyl, 2,4-dichlorophenyl, 3,4-dichlorophenyl, 3-bromophenyl, 2-ethyl-4-chlorophenyl, etc.; or aralkyl radicals such as benzyl, phenyl, phenpropyl, phenbutyl, etc., or alkoxy substituted aralkyl radicals, e.g. 4-methoxy benzyl, 2,4-dimethoxybenzyl, 4-butoxybenzyl, 3-ethoxyphenethyl, etc., or halo-substituted aralkyl radicals, e.g. 4-chlorobenzyl, 2,4-dichlorobenzyl, 3,4-dichlorobenzyl, 2,3,6-trichlorobenzyl, 3-bromobenzyl, 3-bromophenpropyl, etc.; or alkyl radicals such as butyl, amyl, hexyl, octyl, decyl, isodecyl, dodecyl, pentadecyl, octadecyl, etc., or alkoxy substituted alkyl radicals, e.g. methoxyalkyl, ethoxyethyl, methoxypropyl, decyloxypropyl, etc., halo-substituted alkyl radicals such as 4-chlorobutyl, etc.; or alkenyl radicals such as 2-butenyl, e.g., pentenyl, hexenyl, heptenyl, etc., or a halo-substituted alkenyl, 4-chloro-2-butenyl, 4,4-dichloro-2-butenyl, or an alkoxy substituted alkenyl radical, e.g. methoxyallyl, ethoxyallyl, 4-ethoxy-2-butenyl, etc.; or an alkynyl radical such as 2-butynyl, 2-methyl-4-pentyn-3-yl, 2,5-heptadyn-3-yl, or halo-substituted alkynyl radicals, e.g. 1-chloro-3-butyn-2-yl, 1,2-dichloro-4-pentyn-3-yl, 4-bromo-1-pent-4-yn-3-yl, etc. or alkoxy substituted alkynyl radicals, e.g., 4-methoxy-3-butyn-2-yl, 5-ethoxy-4-pentyn-3-yl, etc.; or a cycloalkyl radical such as cyclopentyl, cyclohexyl, cycloheptyl, methylcyclohexyl, cyclohexylmethyl, 2,4-dimethyl cyclohexyl, 4-butyl cyclohexyl, cyclopentyl methyl, cyclopentyl ethyl, or halo-substituted cycloalkyl radicals, e.g. 4-chlorocyclohexyl, 2,4-dichloro-cyclohexyl, 3-bromocyclohexyl, etc., or alkoxy substituted cycloalkyl radicals, e.g. 4-methoxycyclohexyl, 2,4-dimethoxycyclohexyl, 4-ethoxycyclohexyl, etc. Phosphites which contain mixtures of aryl, aralkyl, alkyl, alkenyl, alkynyl and cycloalkynyl radicals are also contemplated. It is preferred that the said $R_1$, $R_2$ and $R_3$ radicals be hydrocarbon radicals. It is still more preferred that the hydrocarbon radical be an aryl, aralkyl or saturated alkyl radical (thus, a hydrocarbon radical free of olefinic and acetylenic unsaturation) containing from 6 to 12 carbon atoms. The phosphite should be non-volatile under the conditions of processing and be soluble in the halogen-containing resin. Illustrative examples of phosphite esters contemplated are triphenyl phosphite, tricresyl phosphite, phenyl dicresyl phosphite, tri(dimethylphenyl)phosphite, tri(4-methoxyphenyl)phosphite, tri(t-amylphenyl)phosphite, diphenyl phosphite, tri(3,4 - dimethylphenyl)phosphite, (4-t-butylphenyl)diphenyl phosphite, 2-ethylhexyl diphenyl phosphite, tri(nonylphenyl)phosphite, tri(3-naphthyl)phosphite, butyl diphenyl phosphite, phenyl dibutyl phosphite, tri-butyl phosphite, tri-2-ethylhexyl phosphite, butyl dioctyl phosphite, n-octyl-didodecyl phosphite, tribenzyl phosphite, tri(phenylpropyl)phosphite, tricyclopentyl phosphite, tricyclohexyl phosphite, tri(butoxyethyl)phosphite, 2-chlorophenyl-diphenyl phosphite, tri(4-chlorophenyl)phosphite, (2 - methyl - 5-isopropylphenyl)di-2-chlorophenyl phosphite, tri(2,4 - dimethoxyphenyl)phosphite, tri(3-methyl-1-butyn-3-yl)phosphite, tri(2-butenyl)phosphite, tri(4-pentenyl)phosphite, tri(2-butynyl)phosphite, tri(1-chloro-3-butynyl-2-yl)phosphite, dibenzyl-3-butynyl phosphite, diphenyl-3-butynyl phosphite.

While the above description has been limited to phosphite triesters, the monoesters and diesters are also contemplated. However, the triesters are especially preferred.

The 2-hydroxybenzophenones useful in the light stabilizer mixtures and halogen-containing resin compositions of this invention are those which have an ultraviolet light cutoff of 85% in the region of from about 340 to about 400 millimicrons. The term "85% cutoff" as used herein, is defined as a point representing that wave length above which less than 85% of the ultraviolet light is absorbed and it is determined by plotting the percent absorption of the 2-hydroxybenzophenone vs. the wave length in millimicrons. The 2-hydroxybenzophenones embraced by the following structure are illustrative of the type which come within the broad scope of this invention:

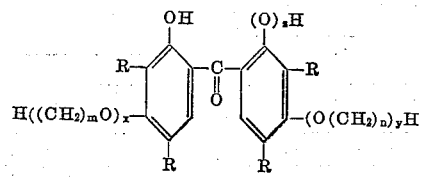

wherein $m$, $n$, $x$, $y$ and $z$ are integers of from 0 to 1 and R is selected from the group consisting of hydrogen, short chain alkyls, e.g. methyl, ethyl, isopropyl, butyl and halogen atoms, e.g. chlorine or bromine. Examples of such are 2-hydroxybenzophenone, 2-hydroxy-5-methylbenzophenone, 2-hydroxy-3,5-dichlorobenzophenone, 2-hydroxy-3,5-dimethylbenzophenone etc. Included within the broad class of 2-hydroxybenzophenones are certain benzophenones which have outstanding light stabilizing properties. Thus, 2-hydroxy benzophenones which have an ultraviolet light cutoff of 85% in the 340–370 millimicrons region of the spectrum are especially preferred. Examples of compounds which come within the scope of this preferred aspect are those which have the above structure but wherein $x$ and $y$ are 1, $z$ is zero or 1 and R is hydrogen. As illustrative of compounds which come within this definition, there may be named 2-hydroxy-4-methoxybenzophenone, 2,2' - dihydroxy - benzophenone, 2,4,4' - trihydroxybenzophenone, 2-hydroxy-4,4'-dimethoxybenzophenone, 2,2' - dihydroxy-4,4'-dimethoxybenzophenone, etc.

This new and novel light stabilizer mixture has been found particularly useful in enhancing the light stability properties of the heat stable halogen-containing resins described in U.S. 2,671,064 which comprise a halogen-containing resin, a plasticizer therefor, a cadmium salt of an organic acid and an epoxy compound containing one or more groups of the structure

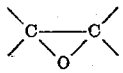

As further illustrative of this invention compositions comprising, respectively,

|  | H | I | J | K | L | M |
|---|---|---|---|---|---|---|
| Polyvinyl chloride | 100 | 100 | 100 | 100 | 100 | 100 |
| Di(2-ethylhexyl)phthalate | 50 | 50 | 25 | 25 | 25 | 25 |
| Butyl benzyl phthalate |  |  | 25 | 25 |  |  |
| 2-ethylhexyl diphenyl phosphate |  |  |  |  | 25 | 25 |
| Epoxidized Soybean Oil (Paraplex G-62) | 3 | 3 | 3 | 3 | 3 | 3 |
| Cadmium/barium dilaurate (co-precipitated mixture Cd:Ba::2:3) | 2 | 2 | 2 | 2 | 2 | 2 |
| 2-hydroxy-4-methoxy benzophenone |  | 2 |  | 2 |  | 2 |
| Triphenyl phosphite (0.5 part of inert diluent included) | 1 | 1 | 1 | 1 | 1 | 1 | are prepared by mixing poly vinyl chloride with the respective ingredients in amounts set forth above on differential speed rolls at a roll temperature of 160° C. to form a homonegenous composition which is removed from the roll in the form of crude sheets. From the crude sheets there are molded finished sheets which are about 0.040 inch in thickness employing a molding cycle of three minutes at 160° C.

The light stability values set forth below are obtained (a) after fadeometer exposure for the stated number of hours and (b) after weatherometer [1] exposure for the stated number of hours.

| Hours/Composition | H | I | J | K | L | M |
|---|---|---|---|---|---|---|
| (fadeometer): |  |  |  |  |  |  |
| 1,200 | Few red specks | colorless | black | colorless | colorless | colorless. |
| 1,800 | Dark red | do |  do | do | dark red | Do. |
| 2,400 |  | few red specks |  | few red specks |  | Do. |
| (weatherometer): |  |  |  |  |  |  |
| 1,200 | Dark red | colorless | black | colorless | few red specks | Do. |
| 2,400 |  | do |  do | do | dark red | Do. |
| 3,000 |  | do |  do | do |  | Do. |
| 4,000 |  | do |  do | do |  | Do. |

The following examples are illustrative of this invention but in no manner are to be construed as limitative thereof.

Compositions comprising, respectively,

|  | A | B | C | D | E | F | G |
|---|---|---|---|---|---|---|---|
| Polyvinyl chloride | 100 | 100 | 100 | 100 | 100 | 100 | 100 |
| Di(2-ethylhexyl)phthalate | 50 | 50 | 50 | 50 | 50 | 50 | 50 |
| Butyl glycidyl phthalate | 3 |  |  |  |  | 3 |  |
| Cadmium dilaurate |  | 0.8 | 0.8 | 0.8 |  |  |  |
| 2-hydroxy-4-methoxy benzophenone |  | 1 | 1 | 1 | 1 |  | 1 |
| Triphenyl phosphite |  |  | 1 | 1 |  | 1 | 1 | are prepared by mixing polyvinyl chloride with the respective ingredients, in amounts set forth above, on differential speed rolls at a roll temperature of 160° C. to form a homogeneous composition which is removed from the roll in the form of crude sheets. From the crude sheets there are molded finished sheets, which are about 0.040 inch in thickness, employing a molding cycle of three minutes at 160° C.

The light stability values set forth below are obtained after weatherometer exposure for 500 and 1000 hours:

| Composition/hours | 500 | 1,000 |
|---|---|---|
| A | dark red | dark red. |
| B | few red specks | red. |
| C | do | many red specks. |
| D | colorless | colorless. |
| E | red | red. |
| F | red (after 300) | dark red. |
| G | colorless | colorless. |

Results similar to those obtained with compositions F, H and J are realized upon substituting cadmium dilaurate, cadmium diricinoleate, cadmium 2-ethylhexoate/barium octylphenate mixture or cadmium stearate, respectively, in substantially the same amount for the cadmium/barium mixture in these formulations.

Compositions having similarly improved light stability properties are prepared by replacing the epoxy compound of compositions I, K and M, i.e. the epoxidized soybean oil, with substantially the same amount, respectively, of butyl glycidyl phthalate, cyclohexyl-9,10-epoxyoctadecanoate, methyl-9,10-epoxy-octadecanoate, glycidyl laurate, 2-ethylhexyl glycidyl adipate, 1,2-epoxytetradecane and 1,2-epoxy-3-(2-naphthoxy)propane.

Similar results are obtained when the triphenyl phosphite in compositions F, H and J is replaced by an equal amount of the following phosphite esters: tricresyl phosphite, tribenzyl phosphite, trioctyl phosphite, trinonyl phosphite, 2-ethylhexyl diphenyl phosphite and tricyclohexyl phosphite.

Results similar to those obtained with compositions F, H and J are also obtained when the polyvinyl chloride

---

[1] A National X-1A weatherometer was operated essentially according to ASTM method D-822-46T. Test specimens were attached to a rotary rack which made a complete revolution around the carbon electrode every two hours. Water sprays operated continuously and each specimen was exposed to the area of direct spray for about 18 minutes during each revolution of the rack. At regular intervals, small segments were cut from the exposed specimens and mounted on white charts such that a profile of color degradation, which occurred as the time elapsed, is visibly evident. The profile charts were not assessed immediately after attaching the exposed specimens because color degradation is not always evident at this time. Instead, the charts were stored overnight in the dark so that any latent degradation that took place with the specimen would have time to become visible.

component of said compositions is replaced by an equivalent amount of the following resins: copolymer of 95 parts of vinyl chloride and 5 parts of vinyl acetate, copolymer of 90 parts vinyl chloride and 10 parts of vinylidene chloride, copolymer of 85 parts of vinyl chloride and 15 parts of diethyl maleate, chlorinated polyvinyl acetate, chlorinated polyvinyl chloride and polyvinylidene chloride.

Because the color retention test above is not an infallible test of the light stability of a halogen-containing resin composition, outdoor exposure tests were made. The outdoor exposure specimens were prepared by mixing the resin, plasticizer, stabilizers and fillers and by milling the mixture at 175° C. for five minutes. The milled specimens were then calendered to a film thickness of 0.004 in. The test films were exposed to the outdoors (Hazelwood, Missouri) on unbacked aluminum racks inclined 45° from the horizontal and facing south. The elongation and tensile strength properties of the films were measured at various intervals during the 18 month exposure. The compositions which were subjected to this test are set forth below:

|  | Formulation | |
| --- | --- | --- |
|  | N | O |
| polyvinyl chloride | 100 | 100 |
| di-isodecyl phthalate | 50 | 50 |
| epoxidized soybean oil (Paraplex G-62) | 3 | 3 |
| Cadmium/barium dilaurate (coprecipitated mixture) | 2 | 2 |
| triphenyl phosphite (0.5 part inert diluent included) | 1 | 1 |
| stearic acid (lubricant) | 0.25 | 0.25 |
| 2-hydroxy-4-methoxybenzophenone |  | 1 |

A model TCC Instron tester was used to measure the physical properties of the specimens. A small die was constructed for this test, since the specimens used were comparatively small themselves. The dumbbell shaped die had an overall length of 2″, the ends ¾″ in width and the center section was ½″ long and 0.05″ wide. The use of this die was found to be very valuable for following the abrupt changes in the mechanical behavior of the film after exposure to heat and light. The crosshead was maintained at 10 in./min. and the full scale load was set at 2 lbs. for the 0.004 in. film. The physical properties of the test specimens at various intervals are given below:

|  | Formulation | | | |
| --- | --- | --- | --- | --- |
|  | N | | O | |
|  | TS (p.s.i.) | Elong., percent | TS (p.s.i.) | Elong., percent |
| June | 3,200 | 360 | 3,125 | 330 |
| August | 3,100 | 350 | 3,200 | 330 |
| November | 2,750 | 200 | 3,215 | 335 |
| July | 2,020 | 140 | 3,140 | 300 |
| November | Complete Failure | | OK | |

Similar results were obtained when the weatherometer specimens (0.04 in. films) were also tested for their physical properties (at 10 lb. load) in that the compositions containing the 2-hydroxy-benzophenone-phosphite ester combination were far superior to the compositions containing either one alone.

As still further illustrative of this invention, compositions comprising, respectively, 100 parts polyvinyl chloride, 25 parts di(2-ethylhexyl)phthalate, 25 parts butyl benzyl phthalate, 3 parts epoxidized soybean oil (containing 6% oxirane oxygen), 2 parts of a coprecipitated barium-cadmium dilaurate (Cd/Ba ratio=2/3), 0.5 part triphenyl phosphite (0.5 part inert diluent), and 1 part of a benzophenone listed below are prepared by mixing the respective ingredients in amounts set forth above on differential speed rolls at a temperature of 160° C. to form a homogeneous composition which is removed from the roll in the form of crude sheets. From the crude sheets there are molded finished sheets, which are about 0.040 inch in thickness, employing a molding cycle of three minutes at 160° C. The light stability values set forth below are for the respective compositions after weatherometer exposure for 500 and 1000 hours.

| Compositions wherein the benzophenone is— | Hours Exposure | | Weatherometer Stability | 85% U.V. Cutoff [1] in mu |
| --- | --- | --- | --- | --- |
|  | 500 | 1,000 | | |
| 2-hydroxy-benzophenone | colorless | colorless | Fair | 358 ([2] 290–311) |
| 4-hydroxy-benzophenone | light yellow | red | Poor | 326 |
| 2-hydroxy-4-methoxy benzophenone | colorless | colorless | Good | 356 |
| 2,2′-dihydroxybenzophenone | do | do | do | 362 |
| 4,4′-dihydroxy-benzophenone | few red specks | red | Poor | 325 |
| 2,4′-dihydroxy-benzophenone | colorless | colorless | Good | 359 |
| 2,4-dihydroxy-4-methoxy-benzophenone | do | do | do | 362 |
| 2,4,4′-trihydroxy-benzophenone | do | do | do | 363 |
| 2-hydroxy-4,4′-dimethoxy-benzophenone | do | do | do | 362 |
| 2,2′-dihydroxy-4,4′-dimethoxy-benzophenone | do | do | do |  |
| 4-methoxy-benzophenone | few red specks | red | Poor |  |
| 4,4′-dimethoxy-benzophenone | red | dark red | do | 334 |
| 3-methoxy-4-hydroxy-benzophenone | light yellow | red | do | 347 |
| 2-hydroxy-5-methyl-benzophenone | colorless | colorless | Fair | 370 ([2] 290–326) |
| 2-hydroxy-3,5-dichloro-benzophenone | do | few red specks | do | 358 ([2] 293–346) |

[1] The ultraviolet light cutoff values given in the foregoing table of results were determined by first measuring (with a Cary Model 11 double beam recording spectrophotometer) the ultraviolet absorption spectrum of the benzophenone compound per se in a dilute ethyl alcohol solution. The absorptivity was calculated at selected wave lengths for the spectral region of 290 to 400 millimicrons by the following equation:

$$\text{Log}\left(\frac{100}{\%T}\right) = O.D. = \alpha C l$$

where
%$T$=percent of incident light transmitted through the sample
O.D.=optical density
$\alpha$=absorptivity
$C$=concentration in grams/100 ml.
$l$=length of the absorbing sample in centimeters.

Using this equation, the ultraviolet absorption spectrum for each compound was calculated for a standard set of conditions, i.e. for a film 0.004″ thick prepared from a formulation consisting of 100 parts PVC, 50 parts plasticizer, 3 parts epoxy compound, 2 parts cadmium salt, 0.5 part triphenyl phosphite (0.5 part inert diluent) and 1 part of benzophenone. It was assumed that in such a formulation that all components except the benzophenone are transparent to ultraviolet light in the region of 290 to 400 millimicrons. The percent of light absorbed by the formulation is calculated by using the following equation:

$$\%A = 100 - \%T$$

where
%$A$=percent of incident light absorbed by the sample
%$T$=percent of incident light transmitted through the sample.

[2] For explanation see text following.

Example

Assuming that an ethyl alcohol solution of a benzophenone compound (0.0040 gm./100 ml.) in a 1 ml. cell transmits 35% of the incident light at wavelength λ, then:

$$O.D. = \log\left(\frac{100}{\%T}\right) = \log\left(\frac{100}{35}\right) = 2.000 - 1.544$$

$$O.D. = 0.456$$

$$\alpha = \frac{OD}{Cl} = \frac{(0.456)}{(0.004)(1.0)}$$

$$\alpha = 114$$

In a formulation 0.004″ thick (0.01016 cm.) consisting of 1 part of a benzophenone compound in a total of 157 parts of material (.637 gms./100), the amount of light absorbed at wavelength λ is:

$$O.D. = \alpha Cl = (114)(0.637)(0.01016)$$
$$O.D. = 0.738$$

$$O.D. = \log\left(\frac{100}{\%T}\right)$$

or $$\log \%T = \log 100 - O.D. = (2.000 - 0.738)$$
$$\log \%T = 1.262$$
$$\%T = 18.3$$
$$\%A = (100 - 18.3)$$
$$\%A = 81.7$$

By plotting the percent absorption versus the wavelength (290–400 region) in millimicrons, a curve was obtained for each component and the 85% absorption point picked off on the curve. This 85% cutoff point represents that wavelength above which less than 85% of the ultraviolet light is absorbed.

From the data obtained with the above benzophenones, it was concluded that a correlation exists between the ultraviolet absorption spectrum of the benzophenone light screening agent per se and its weatherometer performance. In that the formulated benzophenone that had 85% ultraviolet light cutoffs in the region of 340 to 370 mu gave fair to good weatherometer stability, whereas the benzophenones which had poor weatherometer stability had 85% ultraviolet cutoffs displaced toward the shorter wavelength region of 300–330 mu. All 2-hydroxybenzophenones tested were in the good to fair class. The distinguishing feature in correlating good and fair weatherometer stability with the ultraviolet absorption data is the absorption minima exhibited by the fair compounds, i.e. 2-hydroxybenzophenone, 2-hydroxy-5-methyl benzophenone and 2-hydroxy-3,5-dichlorobenzophenone in the region of 290–340 mu (see matter in parentheses in foregoing table), in this region the ultraviolet absorption falls to 60–75%.

When a physical mixture of a phosphite ester and a 2-hydroxy-benzophenone compound of this invention is used as the light stabilizing substance for the heat stable compositions of U.S. 2,671,064 the amounts of the components may be varied considerably and still result in surprising improvements in light stability. For most purposes, however, 0.05 to 10 parts of the 2-hydroxy-benzophenone compound of this invention and 0.1 to 5 parts of the phosphite ester per 100 parts by weight of halogen-containing resin will provide satisfactory results. Mixtures containing 0.5 to 5 parts of the 2-hydroxybenzophenone compound and 0.3 to 1 part of the tri(hydrocarbon)phosphite are especially preferred.

On substituting for the polyvinyl chloride used in the foregoing examples, other halogen-containing resins, it is found that surprisingly effective light stabilization results are also obtained with such other resins, numerous examples of which are well known to those skilled in the art. Thus, for the polyvinyl chloride there may be substituted resins made from such vinylidene compounds as vinylidene chloride, vinyl chloroacetate, chloro styrenes, chloro butadienes, etc. Such vinyl compounds may be polymerized singly or in a mixture with these or other halogen-containing vinylidene compounds or with vinylidene compounds free from halogen. Among the unsaturated materials free from halogen which may be copolymerized with halogen-containing vinylidene compounds are vinyl esters of carboxylic acids, for example, vinyl acetate, vinyl propionate, vinyl butyrate, vinyl benzoate; esters of unsaturated acids, for example, alkyl acrylates, such as methyl acrylate, ethyl acrylate, propyl acrylate, butyl acrylate, allyl acrylate and the corresponding esters of methacrylic acid; vinyl aromatic compounds, for example, styrene, para-ethyl styrene, divinyl benzene, vinyl naphthalene, alpha-methyl styrene; dienes, such as butadiene; unsaturated amides, such as acrylic acid amide, acrylic acid aniline; unsaturated nitriles, such as acrylic acid nitrile; esters of α,β-unsaturated carboxylic acids, for example, the methyl, ethyl, propyl, butyl, amyl, hexyl, heptyl, octyl, allyl, methallyl, and phenyl esters of maleic crotonic, itaconic, fumaric acids and the like. The class of copolymers in which a predominant portion, i.e., more than 50% by weight, of the copolymer is made from a halogen-containing vinylidene compound such as vinyl chloride represents a preferred class of polymers to be treated according to the invention.

Among the preferred embodiments of the invention is the stabilization of polymers prepared by the copolymerization of 95 to 80 parts by weight of a vinyl halide, e.g. vinyl chloride with 5 to 20 parts by weight of an α,β-unsaturated polycarboxylic acid such as diethyl maleate or other esters of maleic, fumaric, aconitic, itaconic acids, etc. Among the preferred esters of such acids are alkyl esters in which the alkyl group contains not over 8 carbon atoms.

The light stabilizer mixture of the invention is also effective when intimately mixed with halogen-containing resins in which part or all of the halogen is introduced into a preformed resin, e.g. chlorinated polyvinyl acetate, chlorinated polystyrene, chlorinated polyvinyl chloride, chlorinated natural and synthetic rubbers, rubber hydrochloride, etc.

The light stabilizer mixture of the invention is also effective in halogen-containing resins containing halogens other than chlorine, e.g., bromine, fluorine and iodine.

The halogen-containing resins may contain a varying proportion of halogen depending upon the nature of the resin and its contemplated use. However, as indicated above, vinyl chloride polymers in which the proportion of vinyl chloride units amount to 50% or more of the total monomer used in making the polymeric product represents a preferred class of polymers to be heat and light stabilized according to the invention.

Ordinarily noted in U.S. 2,671,064 at least 1 part of the epoxy compound is used in stabilizing 100 parts of a halogen-containing resin for most uses and generally, at least 3 parts of the epoxy compound are preferred, although smaller amounts are effective to a considerable degree. Much larger amounts may be used, e.g. 50–100 parts, and serve to lengthen the useful life of the halogen-containing resins although not in direct proportion to the amount used. However, in some cases the epoxy compound may serve both as a plasticizer and an element of the stabilizer mixture and in such cases it may be worth-while to incorporate such larger amounts.

The epoxy compounds used in conjunction with the light stabilizer mixture of this invention comprise organic compounds generally containing one or more

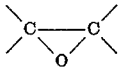

groups. Various substituted and unsubstituted aliphatic, aromatic, alicyclic and heterocyclic groups may be attached to said epoxy groups. Generally, however, the epoxy compounds which are employed should have a boiling point at atmospheric pressure of at least 150° C.; otherwise the stabilizing effect is likely to be relatively transitory due to evaporation of the epoxy compound and preferably the epoxy compounds should have a boiling point of at least 200° C. at atmospheric pressure. Illustrative examples of epoxy compounds which may be used according to the invention are 1,2-epoxytetradecane, 1,2-epoxyoctadecane and other derivatives of long chain alkanes, for example, alkanes having 10–24 carbon atoms having a

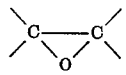

group; epoxy esters containing a long carbon chain such as glycidyl laurate, methyl 9,10-epoxyoctadecanoate, diethylene glycol, di-9,10-epoxyoctadecanoate, 9,10-epoxyoctadecanyl acetate, 9,10-epoxyoctadecanyl octadecanoate, esters of polycarboxylic acids and alcohols containing a

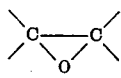

group such as di-2-ethyl hexyl epoxy succinate, butyl glycidyl phthalate, diglycidyl phthalate, propylene glycol diglycidyl phthalate, diethylene glycol diglycidyl maleate, 2-ethyl hexyl glycidyl adipate, hexyl glycidyl sebacate and other esters of these and other polycarboxylic acids containing at least a

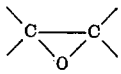

group and epoxidized acids and esters generally containing an unsaturated long chain aliphatic group such as epoxidized animal, vegetable or marine oils or the fatty acids or mixtures of fatty acids contained in such oils and esters thereof, e.g., epoxidized linseed oil, epoxidized soybean oil, epoxidized oleic acid, epoxidized tung oil, the methyl ester of epoxidized linseed oil fatty acids, etc.; glycidols such as glycidol, beta-methyl glycidol, beta-ethyl glycidol, beta-hydroxymethyl glycidol, di-isobutenyl dioxide; epoxidized ethers such as alkyl glycidol ethers in which the alkyl group contains 1–5 carbon atoms, e.g., methyl, ethyl, propyl, butyl, amyl glycidyl ethers; glycidyl ethers containing unsaturated groups such as vinyl, allyl and methylallyl glycidyl ethers, phenyl glycidyl ether, tolyl glycidyl ethers, naphthyl glycidyl ethers, cyclopentyl glycidyl ether, cyclohexyl glycidyl ether, etc. Other illustrative epoxy compounds include cyclohexane oxide, 1-(2-phenyl-phenoxy) propylene oxide-2,3,1-(2-phenyl-cyclohexanoxy) propylene oxide-2,3,1-(cyclohexanoxy) propylene oxide-2,3,1-(2-cyclohexyl-phenoxy) propylene oxide-2,3, 1-(4-tertiary butyl phenoxy) propylene oxide-2,3, styrene oxides such as styrene oxide, para-ethyl styrene oxide, dimethyl styrene oxide, ortho-methoxy styrene oxide, 4-(2,3-epoxypropoxy) acetyl phenone, the corresponding benzophenone epoxide, 4,4'-di(2,3-epoxy-propoxy) benzophenone, mesityl oxide epoxide; epoxy alkyl and epoxy cycloalkyl amides such as 2-ethyl-3-propyl glycidamide, 2,3-di-propylglycidamide; aryloxyalkene oxides such as phenoxy propene oxide, para-tertiary amyl and para-secondary amyl phenoxy propene oxides.

According to one embodiment of the invention the epoxy compounds are epoxy ethers such as the glycidyl ethers of such polyhydric alcohols as glycerin, diglycerol, erythritol, pentaglycerol, pentaerythritol, mannitol, sorbitol, polyallyl alcohol, polyvinyl alcohol, ethylene glycol, propylene glycol, butylene glycol, etc.

One of the preferred classes of epoxy compounds comprises high molecular weight or resinous epoxy compounds, for example, those made by reacting polyhydric phenols with epichlorhydrin in various ratios in alkaline solution. Among the polyhydric phenols which may be used in preparing such glycidyl ethers are mono-nuclear phenols like resorcinol, catechol, hydroquinone, etc., or polynuclear phenols like bis(4-hydroxyphenyl)-2,2-propane (bis-phenol), 4,4'-dihydroxy benzophenone, bis-(4 - hydroxyphenyl) - 1,1 - ethane, bis - (4 - hydroxyphenyl)-1,1-ethane, bis-(4-hydroxyphenyl)-1,1-isobutane, bis - (4 - hydroxyphenyl) - 2,2 - butane, bis - (4 - hydroxy - 2 - methylphenyl) - 2,2 - propane, bis - (4-hydroxy-2-tertiary butyl phenyl)-2,2-propane, bis-(2-dihydroxynaphthyl)-methane, 1,5-dihydroxy naphthalene, phloro glucinol, 1,4-dihydroxy naphthalene, 9,10-dihydroxy anthracene, 1,3,6-trihydroxy naphthalene, 4,4-dihydroxy diphenyl, 2,2-bis(4-hydroxy phenyl) propane and 1,4-bis (4-hydroxy phenyl) cyclohexane, etc. Such phenols may be reacted with epichlorhydrin in the presence of an inorganic alkaline material to form the epoxy compounds, which, depending upon the conditions of the reaction, may be either monomeric or polymeric materials. Examples of such epoxy compounds include 1,4-diglycidol epoxy benzenes and 2,2-bis(4-glycidol oxyphenyl) propanes.

Other compounds containing a

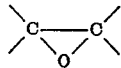

group which may be used in accordance with the invention include those made by reacting alkyl sulfonyl chlorides with glycidol in the presence of ammonia wherein the alkyl group contains up to 20 or more carbon atoms, e.g.

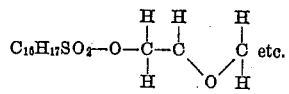

Usually the amount of the cadmium salt is smaller than that of the epoxy compound. While extremely small amounts of the cadmium salt have a noticeable effect on the heat stability, usually at least 0.1 part per 100 parts of halogen-containing resin is used and preferably at least 0.5 part. Generally not over 5–10 parts of the cadmium salt are advantageously used although the use of more than 10 parts for each 100 parts of halogen-containing resin is not precluded. A preferred range is 0.5–5 parts of cadmium salt for each 100 parts of resin.

Various cadmium salts of organic acids may be used, examples of which include those salts made from such acids as saturated aliphatic acids, e.g. ethanoic, propanoic, butanoic, pentanoic, hexanoic, heptanoic, octanoic, nonanoic, decanoic, hendecanoic, dodecanoic, tetradecanoic, hexadecanoic and octadecanoic; mono-olefinic-unsaturated aliphatic acids such as propenoic acid, 2-butenoic acid, 2 - methyl - 2 - propenoic acid, 3 - butenoic acid, 2 - pentenoic acid, 4 - pentenoic acid, 2 - methyl - 2-butenoic acid, 2 - hexenoic acid, 7 - hexadecenoic acid, 10 - undecenoic acid, 13 - docosenoic acid, 2-hexanoic acid, and 9 - octadecenoic acid; diolefinic-unsaturated aliphatic acids such as 2,4-pentadienoic acid, 2,4-hexadienoic acid, 3,7-dimethyl-2,6-octadienoic acid, 9, 12-octadecandienoic acid; triolefinic-unsaturated aliphatic acids such as 3,7-dimethyl-2,4,6-octatrienoic acid, 9,12, 15-octadecatrienoic acid, 9,11,13-octadecatrienoic acid; substituted olefinic acids, for example, such hydroxy olefinic acids as 2-hydroxy-3-butenoic acid, 16-hydroxy-7-hexadecenoic acid and 12-hydroxy-9-octadecenoic acid; acetylenic unsaturated aliphatic acids such as propynoic, butynoic, pentynoic, amyl propynoic, 7-hexadecynoic, 9-octadecynoic and 13-docosynoic acids.

Mixtures of unsaturated aliphatic acids may be employed, as for example, mixtures of acids occurring in various oils, as for example, linseed, castor, tung, soya bean, perilla, corn, cotton seed, sunflower, safflower, sesame, poppy seed, walnut, peanut, olive, rape seed whale and dehydrated castor oils. The acids derived from these oils consist predominantly of unsaturated acids containing 18 carbon atoms. For certain purposes, salts may be used which are made of the mixtures of acids occurring in oils such as palm kernel oil, cocoanut oil and the like, which mixtures of acids contain substantial amounts of unsaturated acids such as those mentioned above, but do not predominate therein.

Other cadmium salts of organic acids may also be used such as cadmium salts of aliphatic polycarboxylic acids, e.g., cadmium salts of maleic, succinic, adipic and sebasic acids, etc., as well as polycarboxylic acids obtained by polymerization of unsaturated fatty acids, e.g., oleic acid dimer and linoleic acid dimer; salts of aromatic acids, e.g. cadmium salts of phenyl-acetic, benzoic, phthalic and salicylic acids; salts of cyclic acids, e.g. the cadmium salt of abietic acid.

The cadmium salts may be either neutral or basic salts when monocarboxylic acids are used. Mixed salts made from mixtures of acids may also be used.

Of the various salts which may be used in the heat stabilizer combination, a preferred class comprises those made from saturated fatty acids containing at least 8 carbon atoms, e.g. 8–13 carbon atoms, such as those mentioned above. Cadmium dilaureate is preferred. Mixtures of cadmium salts and barium salts are also preferred, e.g. mixture of cadmium 2-ethylhexoate and barium octylphenate, co-precipitated mixture of cadmium dilaurate and barium dilaurate, etc.

According to a further embodiment of the invention, the heat stabilizer may comprise a single compound containing cadmium and a

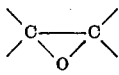

group, e.g. cadmium di-9,10-epoxy octadecanate and other cadmium salts of organic acids containing a

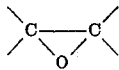

group such as those epoxy acids mentioned above.

The heat and light stabilizer combination of this invention is of particular importance in stabilizing halogen-containing resins especially vinyl chloride polymers plasticized with phosphate esters such as the alkyl diaryl phosphates in which the alkyl group contains 6–14 carbon atoms and the aryl groups are phenyl or cresyl groups, i.e., ortho-, meta- or paracresyl groups and mixtures thereof since compositions containing such plasticizers have proved to be especially difficult to stabilize. Examples of such esters include 2-ethylhexyl diphenyl phosphate, 2-ethylhexyl dicresyl phosphate, 2-ethylhexyl phenyl cresyl phosphate, hexyl diphenyl phosphate, hexyl phenyl cresyl phosphate, hexyl dicresyl phosphate, dodecyl diphenyl phosphate, dodecylphenyl cresyl phosphate, dodecyl dicresyl phosphate, etc. Mixtures of such esters may frequently be used advantageously. The amount of the phosphate ester which is used may be substantially varied depending upon the particular ester and upon the particular use which is contemplated for the plasticized composition. Usually, however, from 10 to 100 parts of the esters are used for every 100 parts of vinyl chloride-containing resin.

As indicated by the examples, plasticizers other than alkyl diaryl phosphate esters may be employed as well as mixtures of such phosphate esters and such conventional plasticizers as dioctyl phthalate, tricresyl phosphate, butyl phthalyl butyl glycolate, etc. In the case of certain halogen-containing resins no plasticizers are required.

This application is a continuation-in-part of application Serial No. 555,311, filed December 27, 1955, now abandoned, which in turn is a continuation-in-part of application Serial No. 487,447, filed February 10, 1955, now abandoned.

While this invention has been described with respect to certain embodiments, it is not so limited and it is to be understood that variations and modifications thereof may be made without departing from the spirit or scope of this invention.

What is claimed is:

1. A mixture containing a phosphite ester of the structure:

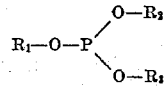

wherein $R_1$ and $R_2$ are selected from the group consisting of hydrogen and organic radicals containing from 4 to 18 carbon atoms and $R_3$ is an organic radical containing from 4 to 18 carbon atoms and 0.05 to 10 parts by weight of a 2-hydroxy-benzophenone which has an ultraviolet light cutoff of 85% in the spectral region of from about 340 to about 400 mu.

2. The mixture of claim 1 in which the 2-hydroxy-benzophenone has the structure:

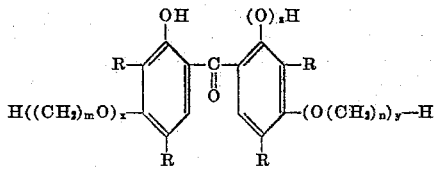

wherein $m$, $n$, $x$, $y$ and $z$ are integers of from 0 to 1 and R is selected from the group consisting of hydrogen, short chain alkyl radicals and a halogen atom.

3. A mixture containing a tri(hydrocarbon)phosphite of the structure

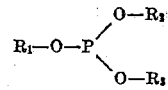

wherein $R_1$, $R_2$ and $R_3$ are hydrocarbon radicals free from olefinic and acetylenic unsaturation containing from 6 to 12 carbon atoms and for each 0.1 to 5 parts of tri (hydrocarbon)phosphite from 0.05 to 10 parts by weight of a 2-hydroxybenzophenone which has an ultraviolet light cutoff of 85% in the spectral region of from about 340 to about 370 mu.

4. The mixture of claim 3 in which the 2-hydroxy-benzophenone has the structure:

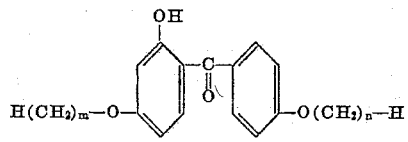

wherein $m$ and $n$, respectively, are integers of from 0 to 1.

5. A light stabilized halogen-containing vinylidene polymer composition comprising a halogen-containing vinylidene polymer in which at least 50% of the monomer units are vinylidene halide units, any balance being units of an ethylenically unsaturated comonomer, 0.1 to 5 parts by weight per 100 parts by weight of said polymer of a phosphite ester of the structure

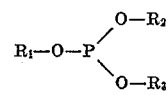

wherein $R_1$ and $R_2$ are selected from the group consisting of hydrogen and organic radicals containing from 4 to 18 carbon atoms and $R_3$ is an organic radical containing from 4 to 18 carbon atoms and 0.05 to 10 parts by weight per 100 parts by weight of said polymer of a 2-hydroxy-benzophenone which has an ultraviolet light cutoff of 85% in the spectral region of from about 340 to about 400 mu.

6. The composition of claim 5 wherein the 2-hydroxybenzophenone has the structure:

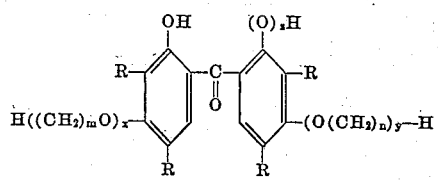

wherein $m$, $n$, $x$, $y$ and $z$ are integers of from 0 to 1 and R is selected from the group consisting of hydrogen, short chain alkyl radicals and a halogen atom.

7. A light stabilized halogen-containing vinylidene polymer composition comprising a vinylidene polymer in which at least 50% of the monomer units are vinylidene halide monomer units, any balance being units of an ethylenically unsaturated comonomer, 0.1 to 5 parts by weight per 100 parts of weight of said polymer of a tri (hydrocarbon) phosphite of the structure

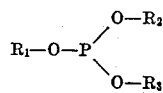

wherein $R_1$, $R_2$ and $R_3$ are hydrocarbon radicals free from olefinic and acetylenic unsaturation containing from 6 to 12 carbon atoms and 0.05 to 10 parts by weight per 100 parts by weight of said polymer of a 2-hydroxybenzophenone which has an ultraviolet light cutoff of 85% in the spectral region of from about 340 to about 370 mu.

8. The composition of claim 7 in which the 2-hydroxybenzophenone has the structure

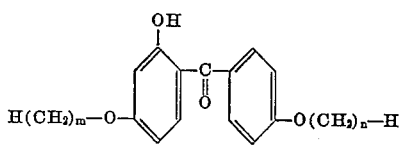

wherein $m$ and $n$ respectively are integers of from 0 to 1.

9. A composition resistant to the deteriorating effects of heat and light comprising a halogen-containing vinylidene polymer in which at least 50% of the monomer units are vinylidene halide units, any balance being derived from an ethylenically unsaturated comonomer, and as a stabilizer therefor (a) in heat stabilizing amounts mixture of a cadmium salt of a carboxylic acid and an epoxy compound characterized by the grouping

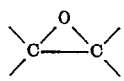

and (b) in light stabilizing amounts in the range of 0.1 to 5 parts per 100 parts of said polymer of a phosphite ester of the structure

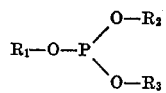

wherein $R_1$, $R_2$ and $R_3$ are organic radicals containing 4 to 18 carbon atoms and 0.05 to 10 parts by weight per 100 parts by weight of said polymer of a 2-hydroxybenzophenone which has an ultraviolet cutoff of 85% in the spectral region of from about 340 to about 400 mu.

10. The composition of claim 9 wherein the 2-hydroxybenzophenone has the structure

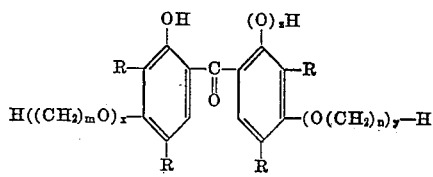

wherein $m$, $n$, $x$, $y$ and $z$ are integers of from 0 to 1 and R is selected from the group consisting of hydrogen, short chain alkyl radicals and a halogen atom.

11. A composition resistant to the deteriorating effects of heat and light comprising a chlorine-containing vinylidene polymer in which at least 50% of the monomer units are vinylidene chloride units, any balance being units of an ethylenically unsaturated comonomer, and as a stabilizer therefor (a) in heat stabilizing amounts a mixture of a cadmium salt of carboxylic acid and an epoxy compound characterized by the grouping

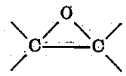

and (b) in light stabilizing amounts in the range of 0.1 to 5 parts per 100 parts of said polymer of a tri(hydrocarbon) phosphite of the structure

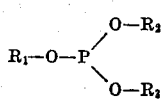

wherein $R_1$, $R_2$ and $R_3$ are hydrocarbon radicals free from olefinic and acetylenic unsaturation containing from 6 to 12 carbon atoms and 0.05 to 10 parts by weight per 100 parts by weight of said polymer of a 2-hydroxybenzophenone which has an ultraviolet light cutoff of 85% in the spectral region of from about 340 to about 370 mu.

12. The composition of claim 11 in which the 2-hydroxybenzophenone has the structure.

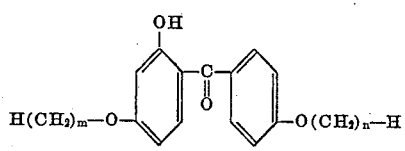

wherein $m$ and $n$ respectively are integers of from 0 to 1.

13. The composition of claim 12 wherein the cadmium salt is the cadmium salt of a saturated fatty acid containing at least 8 carbon atoms.

14. The composition of claim 13 wherein the chlorine-containing vinylidene polymer is a vinyl chloride polymer.

15. The composition of claim 13 wherein the chlorine-containing polymer is polyvinyl chloride.

16. The composition of claim 13 wherein the chlorine-containing vinylidene polymer is a vinyl chloride-vinyl acetate copolymer.

17. The composition of claim 15 having as a plasticizer therefor a phosphate ester plasticizer, the said phosphate ester plasticizer being present in amounts of 10 to 100 parts by weight per 100 parts by weight of the chlorine-containing vinylidene polymer.

18. The composition of claim 17 wherein the phosphate ester plasticizer is an alkyl diaryl phosphate wherein the alkyl group contains from 6 to 14 carbon atoms and the aryl group is a member of the class consisting of phenyl and cresyl radicals.

19. The composition of claim 18 wherein the trihydrocarbon phosphite is triphenyl phosphite.

20. The composition of claim 19 wherein the cadmium salt is a cadmium dilaurate/barium dilaurate co-precipitated mixture.

21. The composition of claim 19 wherein the cadmium salt is a cadmium 2-ethylhexoate/barium octylphenate mixture.

22. The composition of claim 19 wherein the cadmium salt is cadmium dilaurate.

23. A composition resistant to the deteriorating effects of heat and light comprising a chlorine-containing vinylidene polymer in which at least 50% of the monomer units are vinyl chloride monomer units, any balance being units of an ethylenically unsaturated comonomer, and as a stabilizer therefor (a) in heat stabilizing amounts a mixture of a cadmium salt of a carboxylic acid and an epoxy compound characterized by the grouping

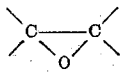

and (b) in light stabilizing amounts a mixture of a trihydrocarbon phosphite, free from olefinic and acetylenic unsaturation containing from 4 to 18 carbon atoms, and 2-hydroxy-4-methoxy benzophenone.

24. The composition of claim 23 wherein the hydrocarbon substituents of the phosphite contain from 6 to 12 carbon atoms, the amount of said phosphite being 0.3 to 1 parts by weight per 100 parts by weight of the chlorine-containing vinylidene polymer.

25. The composition of claim 24 wherein the cadmium salt of a carboxylic acid is the cadmium salt of a saturated fatty acid containing at least 8 carbon atoms, the amount of said salt being 0.5 to 5 parts by weight per 100 parts by weight of the chlorine-containing vinylidene polymer.

26. The composition of claim 25 in which the chlorine-containing vinylidene polymer is a vinyl chloride polymer.

27. The composition of claim 25 in which the chlorine-containing vinylidene polymer is polyvinyl chloride.

28. The composition of claim 25 in which the chlorine-containing vinylidene polymer is a vinyl chloride-vinyl acetate copolymer.

29. The composition of claim 27 having as a plasticizer therefor a phosphate ester plasticizer, the said phosphate being present in amounts of 10 to 100 parts per 100 parts by weight of the chlorine-containing vinylidene polymer.

30. The composition of claim 29 wherein the phosphate ester plasticizer is an alkyl diaryl phosphate wherein the alkyl group contains from 6 to 14 carbon atoms and the aryl group is a member of the class consisting of phenyl and cresyl radicals.

31. The composition of claim 30 wherein the trihydrocarbon phosphite is triphenyl phosphite.

32. The composition of claim 31 wherein the cadmium salt is a cadmium dilaurate/barium dilaurate co-precipitated mixture.

33. The composition of claim 31 wherein the cadmium salt is a cadmium dilaurate.

34. The composition of claim 31 wherein the cadmium salt is a cadmium 2-ethylhexoate/barium octylphenate mixture.

References Cited in the file of this patent

UNITED STATES PATENTS

| | | |
|---|---|---|
| 2,464,250 | Moll et al. | Mar. 15, 1949 |
| 2,477,609 | Irons et al. | Aug. 2, 1949 |
| 2,564,646 | Leistner et al. | Aug. 14, 1951 |
| 2,572,571 | Marling | Oct. 23, 1951 |
| 2,671,064 | Cowell et al. | Mar. 2, 1954 |
| 2,752,319 | Lipke et al. | June 26, 1956 |

UNITED STATES PATENT OFFICE
CERTIFICATION OF CORRECTION

Patent No. 2,951,052                                       August 30, 1960

Joseph R. Darby

It is hereby certified that error appears in the above numbered patent requiring correction and that the said Letters Patent should read as corrected below.

Column 1, line 72, strike out "e.g.,"; column 2, line 1, after "alkenyl," insert -- e.g. --; column 12, line 19, after "and" insert -- for each 0.1 to 5 parts by weight of phosphite ester from --; column 13, line 47, after "amounts" insert -- a --.

Signed and sealed this 13th day of June 1961.

(SEAL)
Attest:

ERNEST W. SWIDER                                   DAVID L. LADD
Attesting Officer                                      Commissioner of Patents